(12) United States Patent
Liang

(10) Patent No.: US 12,166,220 B1
(45) Date of Patent: Dec. 10, 2024

(54) CELL TOP COVER AND CELL

(71) Applicant: Jinko Energy Storage Technology Co., Ltd., Haining (CN)

(72) Inventor: Yadong Liang, Haining (CN)

(73) Assignee: Jinko Energy Storage Technology Co., Ltd., Zhejiang (CN)

( * ) Notice: Subject to any disclaimer, the term of this patent is extended or adjusted under 35 U.S.C. 154(b) by 0 days.

(21) Appl. No.: 18/514,905

(22) Filed: Nov. 20, 2023

(30) Foreign Application Priority Data

Sep. 1, 2023 (CN) .......................... 202311129541.X

(51) Int. Cl.
| | |
|---|---|
| *H01M 50/15* | (2021.01) |
| *H01M 50/159* | (2021.01) |
| *H01M 50/184* | (2021.01) |
| *H01M 50/188* | (2021.01) |
| *H01M 50/55* | (2021.01) |

(52) U.S. Cl.
CPC .......... *H01M 50/15* (2021.01); *H01M 50/159* (2021.01); *H01M 50/184* (2021.01); *H01M 50/188* (2021.01); *H01M 50/55* (2021.01)

(58) Field of Classification Search
CPC .......... H01M 50/10–103; H01M 50/116–136; H01M 50/147–15; H01M 50/155–166; H01M 50/547; H01M 50/55–553; H01M 50/557
See application file for complete search history.

(56) References Cited

U.S. PATENT DOCUMENTS

| | | | | |
|---|---|---|---|---|
| 2012/0148910 | A1* | 6/2012 | Kambayashi | ....... H01M 50/553 |
| | | | | 429/179 |
| 2012/0264007 | A1* | 10/2012 | Sasaki | ................. H01M 50/147 |
| | | | | 429/182 |

(Continued)

FOREIGN PATENT DOCUMENTS

| | | |
|---|---|---|
| CN | 201364916 Y | 12/2009 |
| CN | 107302064 A * | 10/2017 ............ H01M 50/15 |

(Continued)

OTHER PUBLICATIONS

Machine translation of Zheng, CN 107302064. Originally available Oct. 27, 2017. (Year: 2017).*

(Continued)

*Primary Examiner* — Jonathan Crepeau
*Assistant Examiner* — Jacob Buchanan
(74) *Attorney, Agent, or Firm* — USCH Law, PC

(57) ABSTRACT

A cell top cover and a cell are provided. The cell top cover includes an aluminum sheet, at least one pole post, and at least one upper plastic member. The aluminum sheet defines at least one pole through-hole, each respective pole post penetrates through a respective pole through-hole of the at least one pole through-hole, and the at least one upper plastic member is disposed on a top side of the aluminum sheet, and a respective upper plastic member is sleeved and fixed on the respective pole post. The aluminum sheet is provided with at least one limiting portion on the top side of the aluminum sheet, and a respective limiting portion protrudes from a circumferential side of the respective pole through-hole, and is fitted with the respective upper plastic member to limit rotation of the respective upper plastic member relative to the aluminum sheet.

12 Claims, 4 Drawing Sheets

(56) References Cited

U.S. PATENT DOCUMENTS

| | | | | |
|---|---|---|---|---|
| 2015/0017501 | A1* | 1/2015 | Harayama | H01M 50/103 |
| | | | | 429/158 |
| 2019/0067650 | A1* | 2/2019 | Li | H01M 50/155 |
| 2020/0035964 | A1* | 1/2020 | Zhang | H01M 10/0525 |
| 2023/0048535 | A1 | 2/2023 | Fujii et al. | |

FOREIGN PATENT DOCUMENTS

| | | | | | |
|---|---|---|---|---|---|
| CN | 207967196 U | 10/2018 | | | |
| CN | 209418633 U | 9/2019 | | | |
| CN | 210897349 U | 6/2020 | | | |
| CN | 111430638 A | 7/2020 | | | |
| CN | 211045494 U | 7/2020 | | | |
| CN | 113054298 A | 6/2021 | | | |
| CN | 213636231 U | 7/2021 | | | |
| CN | 213989020 U | 8/2021 | | | |
| CN | 214280154 U | 9/2021 | | | |
| CN | 113497306 A | 10/2021 | | | |
| CN | 214753929 U | 11/2021 | | | |
| CN | 215266476 U | 12/2021 | | | |
| CN | 215342865 U | 12/2021 | | | |
| CN | 215418522 U | 1/2022 | | | |
| CN | 215816255 U | 2/2022 | | | |
| CN | 216085075 U | 3/2022 | | | |
| CN | 216120625 U | 3/2022 | | | |
| CN | 217158533 U | 8/2022 | | | |
| CN | 217306615 U | 8/2022 | | | |
| CN | 115395155 A | 11/2022 | | | |
| CN | 115528378 A | 12/2022 | | | |
| CN | 218070137 U | 12/2022 | | | |
| CN | 218070154 U | 12/2022 | | | |
| CN | 218299986 U | 1/2023 | | | |
| CN | 218351675 U | 1/2023 | | | |
| CN | 115692966 A | 2/2023 | | | |
| CN | 218677349 U | 3/2023 | | | |
| CN | 219180634 U | 6/2023 | | | |
| CN | 116404323 A | 7/2023 | | | |
| CN | 219498140 U | 8/2023 | | | |
| CN | 117039365 A | 11/2023 | | | |
| EP | 4184672 A1 | 5/2023 | | | |
| EP | 4184673 A1 | 5/2023 | | | |
| JP | H11204093 A | 7/1999 | | | |
| JP | 2004095457 A | 3/2004 | | | |
| JP | 2004178820 A | 6/2004 | | | |
| JP | 2006236948 A | 9/2006 | | | |
| JP | 2010165590 A | 7/2010 | | | |
| JP | 2012190817 A | 10/2012 | | | |
| JP | 2012212569 A | 11/2012 | | | |
| JP | 2013243075 A | 12/2013 | | | |
| JP | 2016125564 A | 7/2016 | | | |
| JP | 2018079822 A | 5/2018 | | | |
| JP | 2018512547 A | 5/2018 | | | |
| JP | 2021086699 A | 6/2021 | | | |
| JP | 2021106464 A | 7/2021 | | | |
| JP | 2022094139 A | 6/2022 | | | |
| JP | 2022113312 A | 8/2022 | | | |
| KR | 20060112743 A | * | 11/2006 | | H01M 50/308 |
| KR | 20230089960 A | 6/2023 | | | |
| WO | 2022077904 A1 | 4/2022 | | | |

OTHER PUBLICATIONS

Machine translation of Uh, KR 2006-112743. Originally available Nov. 2, 2006. (Year: 2006).*

Jinko Energy Storage Technology Co., Ltd., Extended European Search Report, EP 23209100.9, May 3, 2024, 9 pgs.

Jinko Energy Storage Technology Co., Ltd., Extended European Search Report, EP 23212773.8, Sep. 20, 2024, 37 pgs.

* cited by examiner

CELL TOP COVER AND CELL

CROSS REFERENCE TO RELATED APPLICATIONS

The present application claims the benefit of priority under the Paris Convention to Chinese Patent Application No. 202311129541.X filed on Sep. 1, 2023, which is incorporated herein by reference in its entirety.

TECHNICAL FIELD

The various embodiments described in this document relate in general to the technical field of energy storage cells, and more specifically to a cell top cover and a cell.

BACKGROUND

At present, the top cover of the energy storage cell in the market generally includes at least one pole post, at least one upper plastic member, an aluminum sheet, and other structures. The aluminum sheet defines at least one pole through-hole, each respective upper plastic member is disposed above a respective pole through-hole of the aluminum sheet, and each pole post penetrates through the respective pole through-hole and then is fixedly connected with the respective upper plastic member. In order to reduce the safety issues of the energy storage cell in the use of energy storage cells caused by mutual rotation of the pole post and the upper plastic member relative to the aluminum sheet, in the related technologies, one method is to fill particles between the upper plastic member and the aluminum sheet to avoid rotation of the pole post and the upper plastic member relative to the aluminum sheet, but such method is complicated in assembly and has low reliability for safe use.

Therefore, the cell top cover in the related technologies has problems of complex assembly and low reliability in safe use.

SUMMARY

Embodiments of the disclosure provide a cell top cover and a cell, to reduce assembly complexity and improve the reliability of safe use.

In view of above technical problems, embodiments of the disclosure provide a cell top cover including an aluminum sheet, at least one pole post, and at least one upper plastic member. The aluminum sheet defines at least one pole through-hole, each respective pole post of the at least one pole post penetrates through a respective pole through-hole of the at least one pole through-hole. The at least one upper plastic member is disposed on a top side of the aluminum sheet, and a respective upper plastic member of the at least one upper plastic member is sleeved and fixed on the respective pole post. The aluminum sheet is provided with at least one limiting portion on the top side of the aluminum sheet. A respective limiting portion of the at least one limiting portion protrudes from a circumferential side of the respective pole through-hole. The respective limiting portion is fitted and connected with the respective upper plastic member to limit rotation of the respective upper plastic member relative to the aluminum sheet.

According to the cell top cover provided in the disclosure, the rotation of the upper plastic member relative to the aluminum sheet can be limited only by limiting the respective upper plastic member on the aluminum sheet through the limiting portion. Compared with the method of filling particles between the upper plastic member and the aluminum sheet to avoid the rotation of the upper plastic member in the related technologies, in the embodiments of the disclosure, since the limiting portion is provided, the rotation of the upper plastic member relative to the aluminum sheet can be limited by mounting the upper plastic member on the aluminum sheet without additional filling particles between the upper plastic member and the aluminum sheet, thus reducing the assembly complexity of the core top cover. In addition, compared with the method of filling the particles between the upper plastic member and the aluminum sheet, to prevent the upper plastic member from rotating relative to the aluminum sheet by increasing the friction force between the upper plastic member and the aluminum sheet, in the embodiments of the disclosure, the method of limiting the upper plastic member from rotating relative to the aluminum sheet has higher reliability, so that the reliability of the safe use of the core top cover can be improved. Therefore, the core top cover in the disclosure can reduce the assembly complexity and improve the reliability of the safe use.

In some embodiments, the respective limiting portion is a protrusion structure arranged on the circumferential side of the respective pole through-hole. The respective upper plastic member is provided with a recessed portion, on a bottom side of the respective upper plastic member close to the aluminum sheet, corresponding to the protrusion structure, and the protrusion structure is snapped into the recessed portion. In this way, the rotation of the upper plastic member relative to the aluminum sheet can be limited by a simple structure, thereby making the structure between the upper plastic member and the aluminum sheet simpler.

In some embodiments, the protrusion structure includes: a first boss and at least one second boss. The first boss protrudes upward from the circumferential side of the respective pole through-hole. The at least one second boss protrudes upward from a partial region of a top side of the first boss away from the aluminum sheet. In this way, arrangement of the two-layer limiting structure of the first boss and the at least one second boss can enhance the resistance of the upper plastic member and the aluminum sheet to the torsion force, so as to improve the reliability of the limiting portion, thereby further improving the reliability of the safe use of the core top cover; In addition, the first boss can provide a stop to the circumference side of the pole through-hole, so as to prevent the electrolyte in the core structure from leaking out from the pole through-hole.

In some embodiments, the first boss is a rectangular boss and each second boss of the at least one second boss is a strip-shaped boss. A plurality of second bosses are disposed on the first boss, and the plurality of second bosses are uniformly arranged on two opposite edges, of the first boss, arranged in a length direction of the first boss. In this way, the plurality of strip-shaped second bosses have relatively strong resistance to torsion force, thereby further improving the reliability of the limiting portion.

In some embodiments, the second boss is an arc-shaped boss, and an arc center of the respective second boss is inconsistent with a center of the respective pole through-hole.

In some embodiments, the first boss and the at least one second boss are integrally formed with the aluminum sheet. The respective pole post is integrally formed with the respective upper plastic member after penetrating through the respective pole through-hole, and the bottom side of the respective upper plastic member is firmly attached to the top side of the aluminum sheet. In this way, the first boss and the at least one second boss are integrally formed with the aluminum sheet, which is convenient for processing and manufacturing the aluminum sheet. The upper plastic member being integrally formed with the pole post and being closely attached to the top side of the aluminum sheet help to improve the sealing performance between the upper plastic member, the pole post, and the aluminum sheet.

In some embodiments, the recessed portion includes a first sinking table recessed from the bottom side of the respective upper plastic member in a direction away from the aluminum sheet, and the first sinking table has a shape adapted to a shape of the first boss. In this way, the first sinking table and the first boss are firmly attached to each other, which can prevent the electrolyte in the core structure from leaking out from the pole through-hole, and can also improve the resistance of the first sinking table and the first boss to the torsion force, thereby improving the reliability of the protrusion structure and the recessed portion.

In some embodiments, the recessed portion further includes at least one second sinking table that is recessed from a partial region of a bottom side of the first sinking table close to the aluminum sheet in the direction away from the aluminum sheet, and a respective second sinking table of the at least one second sinking table has a shape adapted to a shape of the respective second boss. In this way, the second sinking table and the second boss are closely attached to each other, which can prevent the electrolyte in the core structure from leaking out from the pole through-hole, and can also improve the resistance ability of the second sinking table and the second boss to the torsion force, thereby further improving the limiting ability between the protrusion structure and the recessed portion, and further improving the reliability thereof.

In some embodiments, the respective pole post is provided with an embedded portion on a circumferential side of the respective pole post and at a position corresponding to the respective pole through-hole, and a mating portion is provided on an inner wall of the respective pole through-hole. The embedded portion is fitted and connected with the mating portion, in such a manner that the respective pole post is fixed in the respective pole through-hole. In this way, since the upper plastic member is sleeved and fixed on the pole post, the pole post is fixed in the pole through-hole of the aluminum sheet, which can further prevent the upper plastic member from rotating relative to the aluminum sheet, and further improve the reliability of the safe use of the core top cover.

Embodiments of the disclosure further provide a cell including the cell top cover described in any embodiment of the disclosure. In the cell, the at least one upper plastic member of the cell top cover is mounted on the aluminum sheet, which can limit rotation of the upper plastic member relative to the aluminum sheet, and does not need to additionally fill particles between the upper plastic member and the aluminum sheet, thereby reducing the assembly complexity of the cell top cover. In addition, the manner of using the limiting portion to limit the upper plastic member to rotate relative to the aluminum sheet has a relatively high reliability, such that the reliability of safe use of the cell top cover can be improved.

BRIEF DESCRIPTION OF THE DRAWINGS

One or more embodiments are described as examples with reference to the corresponding figures in the accompanying drawings and the exemplary illustration does not constitute a limitation to the embodiments. Elements with same reference numerals in the figures are represented as similar elements. Unless otherwise stated, the figures in the accompanying drawings do not constitute a proportion limitation.

Figure 1:
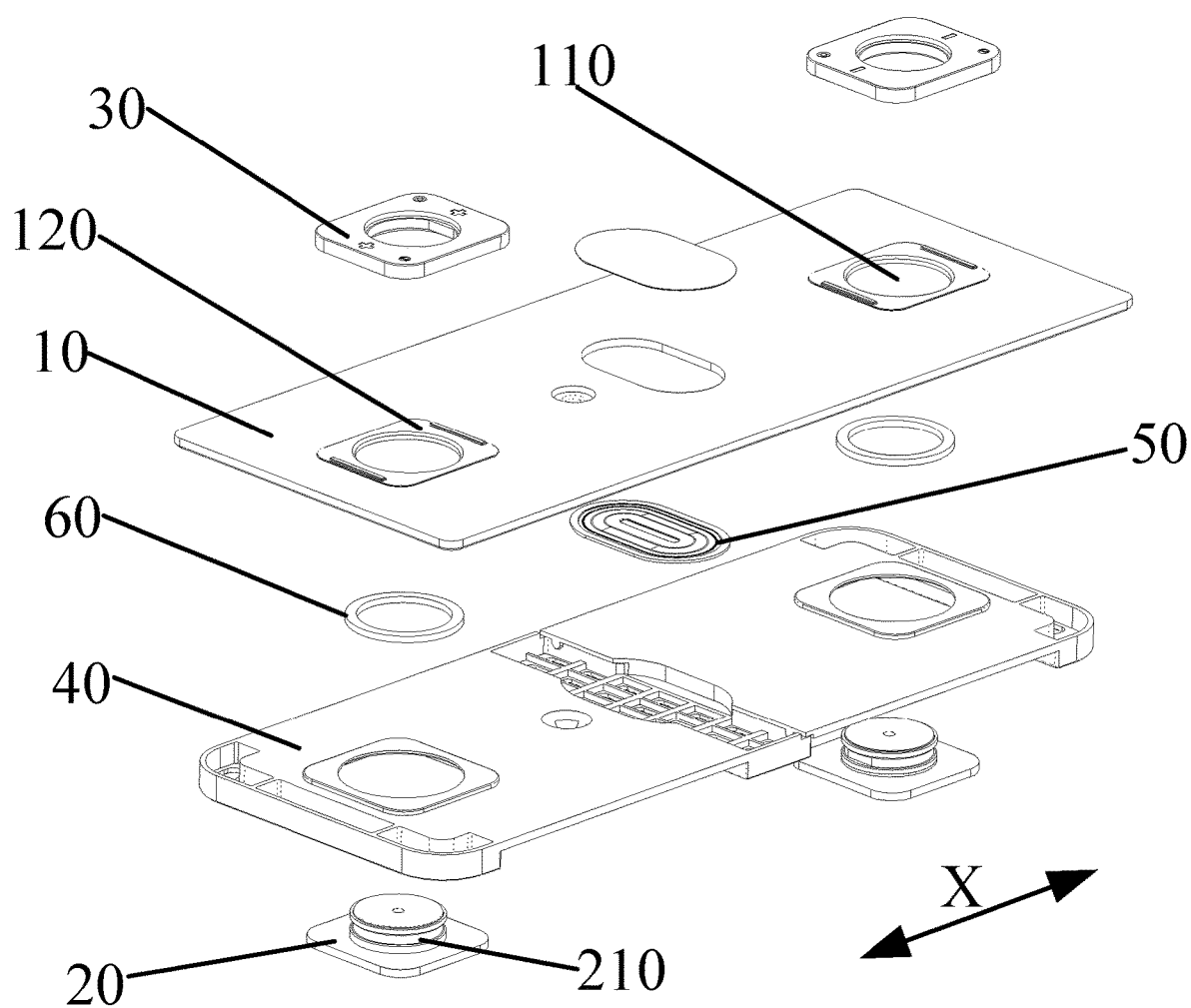
FIG. 1 is an exploded view of a cell top cover according to embodiments of the present disclosure.

Reference numerals are illustrated as follows:

10: aluminum sheet; 110: pole through-hole; 111: mating portion; 120: limiting portion; 121: first boss; 122: second boss; 20: pole post; 210: embedded portion; 30: upper plastic member; 310: recess; 311: first sinking table; 312: second sinking table; 40: lower plastic member; 50: explosion-proof valve; 60: sealing ring; X: length direction of the first boss.

DETAILED DESCRIPTION OF THE EMBODIMENTS

In order to enable the object, technical solutions, and advantages of the embodiments of the disclosure clearer, embodiments of the disclosure may be described in detail below with reference to accompanying drawings. However, one of ordinary skill in the art may appreciate that in various embodiments of the disclosure, numerous technical details have been provided to better understand the disclosure for the reader. It shall be understood that even without these technical details and variations and modifications based on the following embodiments, the technical solutions herein may be realized.

In embodiments of the disclosure, terms "up", "down", "left", "right", "front", "back", "top", "bottom", "inside", "outside", "middle", "vertical", "horizontal", "transverse", "longitudinal", and the like indicating an orientation or positional relationship are orientation or positional relationship based on the drawings. These terms are mainly intended to better describe the disclosure and embodiments of the disclosure and are not intended to limit that the indicated device, element, or component must have a particular orientation or be constructed and operated in the particular orientation.

In addition, some of the above terms may be used to express other meanings besides the orientation or positional relationship. For example, the term "up" may also be used to express a certain attachment or connection relationship in some cases. The specific meanings of these terms in the disclosure may be understood by those of ordinary skill in the art according to actual situations.

Furthermore, terms "installation/mounting", "arrangement", "provided with", "defining", "connection", and "coupling" shall be understood broadly. For example, the "connection" and "coupling" could be understood as a fixed connection, a detachable connection, or a monolithic construction. Alternatively, the "connection" and "coupling" could be understood as a mechanical connection or an electrical connection, or a direct connection, or indirect connection through an intermediate medium. Alternatively, the "connection" and "coupling" may indicate internal connection between two devices, elements, or components. The specific meanings of the above terms in the disclosure may be understood by those of ordinary skill in the art according to actual situations.

Furthermore, terms "first", "second", etc. are mainly used to distinguish from different devices, elements, or components (specific types and configurations of the devices, elements, or components may be the same or different), and are not intended to indicate or imply the relative importance and quantity of the indicated devices, elements, or components. Unless otherwise stated, "multiple/a plurality of" means two or more.

Figure 2:
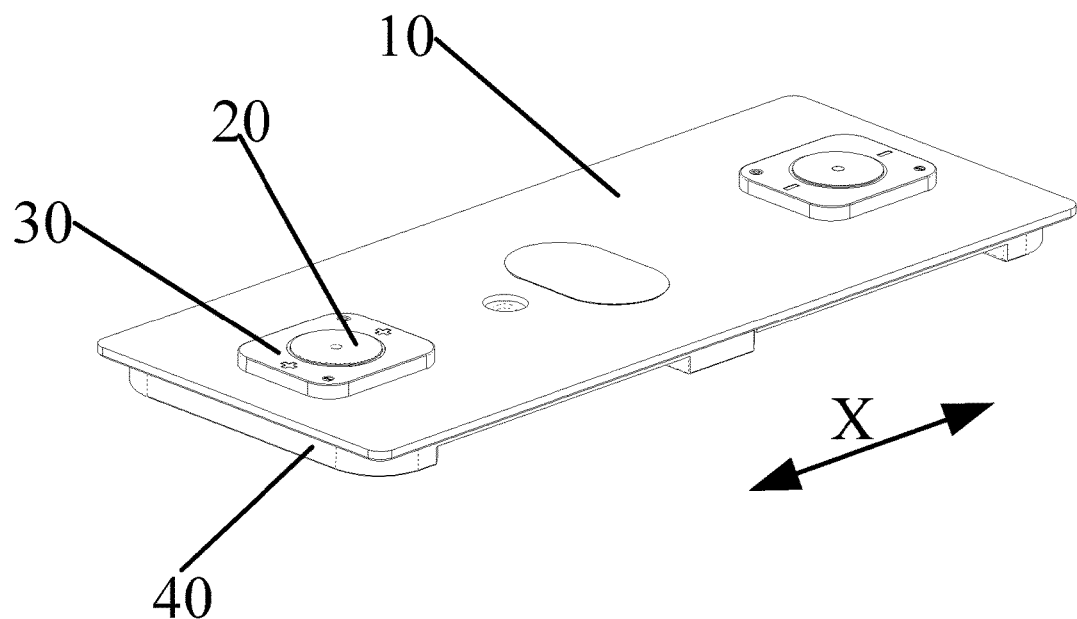
FIG. 2 is a schematic structural view of a cell top cover according to embodiments of the present disclosure.

Embodiments of the disclosure provide a cell top cover. Referring to FIGS. 1 and 2, the cell top cover includes an aluminum sheet 10, at least one pole post 20, and at least one upper plastic member 30. The aluminum sheet 10 defines at least one pole through-hole 110. Each respective pole post 20 penetrates through a respective pole through-hole 110. The at least one upper plastic member 30 is arranged on a top side of the aluminum sheet 10, and a respective upper plastic member 30 is sleeved and fixed on the respective pole post 20. The aluminum sheet 10 is provided with at least one limiting portion 120 on the top side of the aluminum sheet 10. A respective limiting portion 120 protrudes from a circumferential side of the respective pole through-hole 110. The respective limiting portion 120 is fitted and connected with the respective upper plastic member 30, to limit rotation of the upper plastic member 30 relative to the aluminum sheet 10.

In some embodiments, the upper plastic member 30 can be integrally formed with a plastic material, e.g., the upper plastic member 30 is made of polypropylene (PP) or other plastic materials with good corrosion resistance and high temperature resistance.

According to the cell tope cover of the disclosure, the rotation of the upper plastic member 30 relative to the aluminum sheet 10 can be limited merely by limiting the upper plastic member 30 on the aluminum sheet 10 through the limiting portion 120. Compared with the manner of filling particles between the upper plastic member 30 and the aluminum sheet 10 to avoid the rotation of the upper plastic member 30 in the related technologies, in the embodiments of the disclosure, since the limiting portion 120 is provided and disposed at the circumferential side of the pole through-hole 110, when the upper plastic member 30 of the cell top cover is mounted to the aluminum sheet 10, the rotation of the upper plastic member 30 relative to the aluminum sheet 10 can be limited. In this way, there is no need to additionally fill the particles between the upper plastic member 30 and the aluminum sheet 10, thereby reducing the assembly complexity of the cell top cover. In addition, compared with the manner of filling the particles between the upper plastic member 30 and the aluminum sheet 10 to prevent the upper plastic member 30 from rotating relative to the aluminum sheet 10 by increasing the friction force between the upper plastic member 30 and the aluminum sheet 10, in the embodiments of the disclosure, the method of using the limiting portion 120 to limit the rotation of the upper plastic member 30 relative to the aluminum sheet 10 has higher reliability, thus improving the reliability of the safe use of the cell top cover. Therefore, the cell top cover in the disclosure can reduce the assembly complexity and improve the reliability of the safe use.

Specifically, each limiting portion 120 may be a protrusion, an adsorption member, or the like. In embodiments of the disclosure, each limiting portion 120 is a protrusion structure provided on the circumferential side of the respective pole through-hole 110. Each respective upper plastic member 30 is provided with a corresponding recessed portion 310, on a bottom side of the respective upper plastic member 30 close to the aluminum sheet 10, corresponding to a respective protrusion structure. The respective protrusion structure is snapped into the recessed portion 310, so that the rotation of the upper plastic member 30 relative to the aluminum sheet 10 can be limited by a simple structure, thereby simplifying the structure between the upper plastic member 30 and the aluminum sheet 10.

Figure 3:
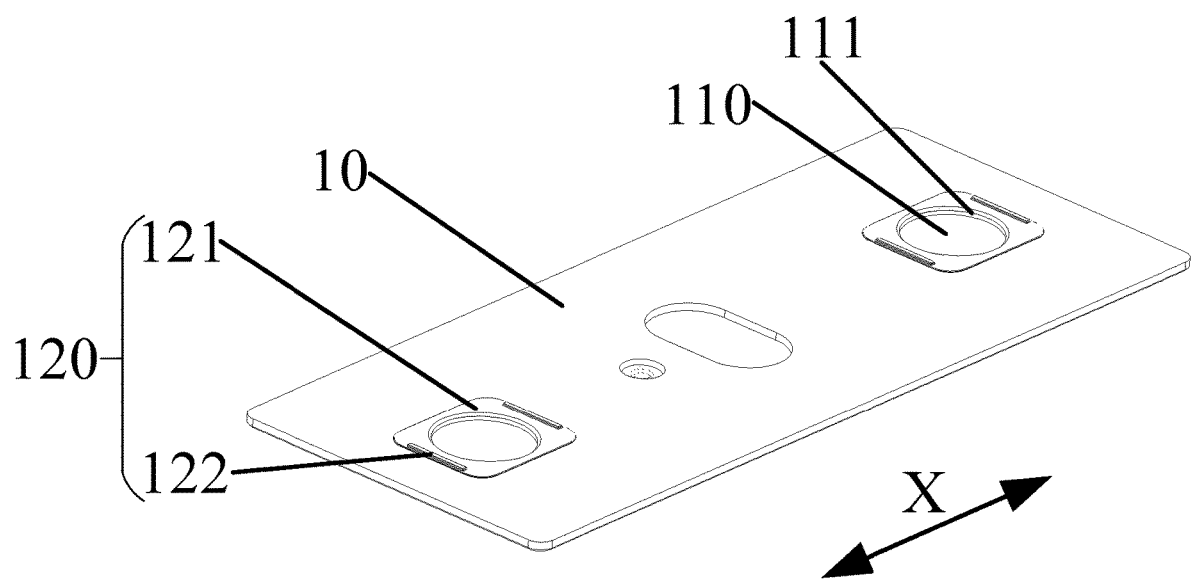
FIG. 3 is a schematic structural diagram of an aluminum sheet of the cell top cover according to embodiments of the present disclosure.
Figure 4:
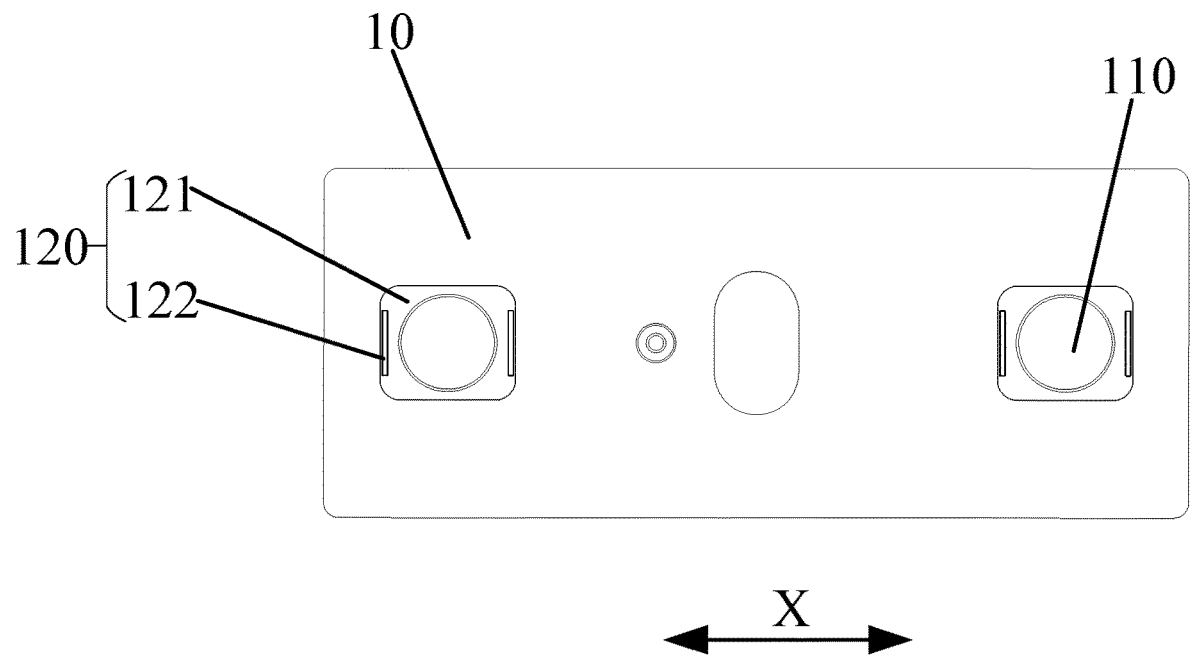
FIG. 4 is a schematic top view of an aluminum sheet of a cell top cover according to embodiments of the present disclosure.
Figure 5:
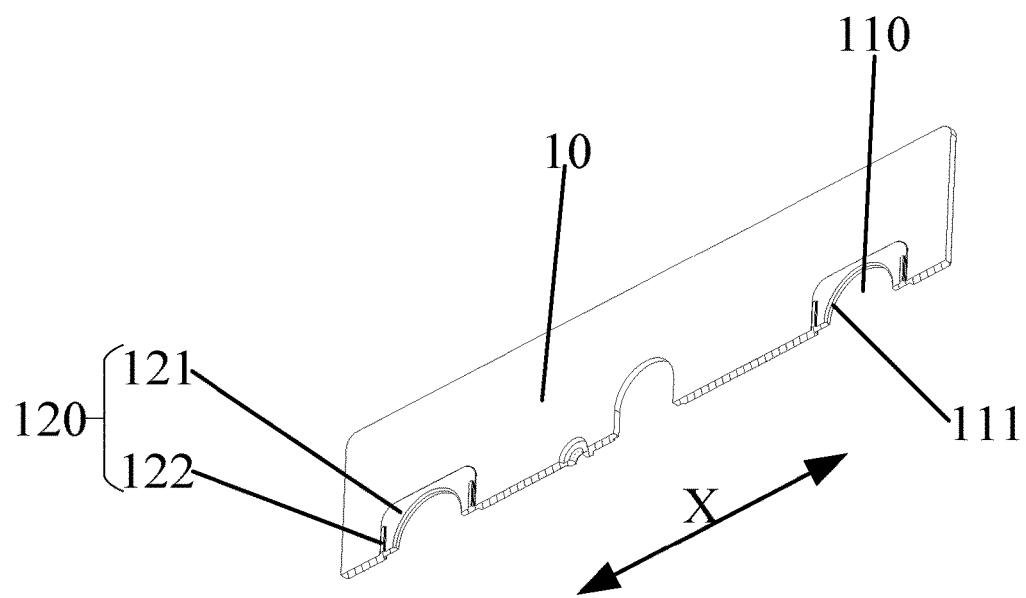
FIG. 5 is a schematic cross-sectional structural view of the aluminum sheet of FIG. 3.

More specifically, referring to FIGS. 3 to 5, the protrusion structure includes a first boss 121 and at least one second boss 122. The first boss 121 protrudes upward from the circumferential side of the pole through-hole 110 and each second boss 122 protrudes upward from a partial region of a top side of the first boss 121. Therefore, arrangement of the two-layer limiting structure formed by the first boss 121 and the at least one second boss 122 can enhance the resistance to torsion force between the upper plastic member 30 and the aluminum sheet 10, so as to improve the reliability of the limiting portion 120, thereby further improving the reliability of the safe use of the cell top cover. The first boss 121 can provide a stop to the circumference side of the pole through-hole 110 to prevent electrolyte in the cell from leaking out from the pole through-hole 110.

Specifically, the first boss 121 is smoothly connected with the circumferential side of the pole through-hole 110. The first boss 121 may have a shape same as or different from a shape of the upper plastic member 30. Optionally, the shape of the first boss 121 is the same as that of the upper plastic member 30, to improve the sealing performance between the first boss 121 and the upper plastic member 30 and to improve the reliability of the first boss 121. The first boss 121 may be a circular boss, a rectangular boss, a special-shaped boss, or the like. In the present embodiment, the first boss 121 is substantially rectangular (e.g., the first boss 121 has a rectangular shape in a cross section in a direction parallel to the top side of the aluminum sheet 10), and each second boss 122 is substantially strip-shaped. Specifically, the second boss 122 may be a boss in a shape of a straight line or a non-straight-line shaped boss. The non-straight-line shaped boss may be a S-shaped boss, a C-shaped boss, an arc-shaped boss, or the like. When the second boss 122 is an arc-shaped boss, an arc center of the second boss 122 does not coincide with a center of the pole through-hole 11. In this way, it is possible to avoid a decrease in the resistance of the second boss 122 to the torsion force when the arc center of the second boss 122 coincides with the center of the pole through-hole 110.

The at least one second boss 122 is configured as a plurality of second bosses 122. That is, the plurality of second bosses 122 are provided on the first boss 121. The plurality of second bosses 122 are uniformly arranged on two opposite edges, of the first boss 121, arranged in a length direction X of the first boss 121, e.g., the plurality of second bosses 122 are uniformly provided on two opposite short edges. Specifically, if there are two second bosses 122, one of the two second bosses 122 is disposed on one edge of the two opposite edges of the first boss 121 arranged in the length direction X thereof, and the other of the two second bosses 122 is disposed on the other edge of the two opposite edges. Alternatively, if there are four second bosses 122, two of the four second bosses 122 are disposed on one edge of the two opposite edges of the first boss 121 arranged in the length direction X thereof, and the remaining two of the four second bosses 122 are disposed on the other edge of the two opposite edges. In addition, there may be an odd number of second bosses 122, e.g., three second bosses 122, five second bosses 122, or the like. For example, if there are three second bosses 122, one second boss 122 of the three second bosses 122 may be disposed on one edge of the two opposite edges, of the first boss 121 arranged in the length direction X thereof, and the remaining two second bosses 122 are disposed on the other edge of the two opposite edges. The plurality of strip-shaped second bosses 122 have a relatively strong resistance to the torsion force, such that the reliability of the limiting portion 120 can be further improved. Optionally, on the premise of ensuring the resistance of the second bosses 122 to torsion force, in order to simplify the protrusion structure, merely two second bosses 122 are provided in embodiments of the disclosure.

It shall be understood that the plurality of second bosses 122 may be uniformly arranged on two opposite long edges of the first boss 121 connected between the two opposite short edges. For example, if there are two second bosses 122, one of the two second bosses 122 is disposed on one of the two opposite long edges, and the other of the two second bosses 122 is disposed on the other of the two opposite long edges. If there are other numbers of second bosses 122, the second bosses 122 may be arranged in similar manners.

Figure 6:
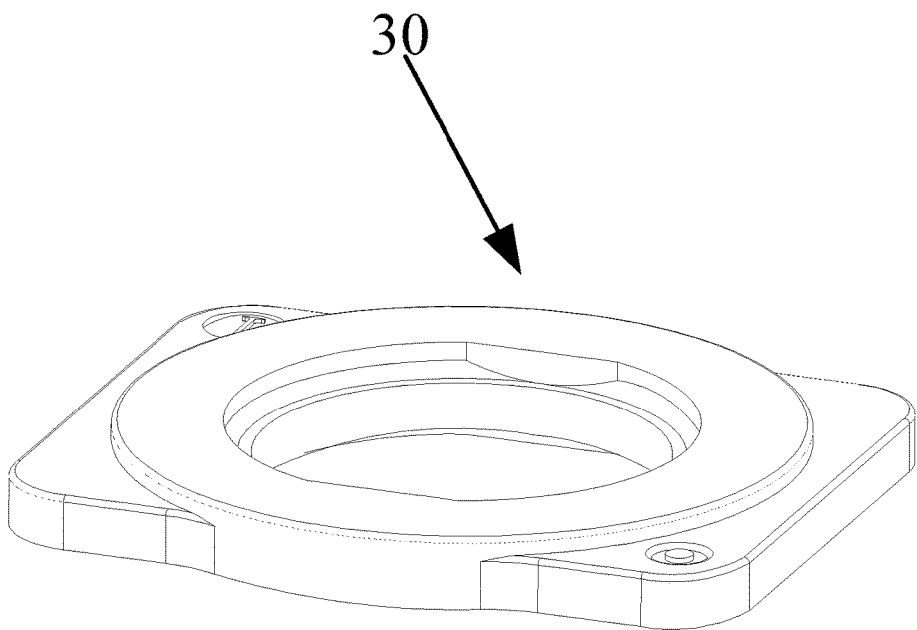
FIG. 6 is a schematic structural diagram of an upper plastic member of the cell top cover according to embodiments of the present disclosure.
Figure 7:
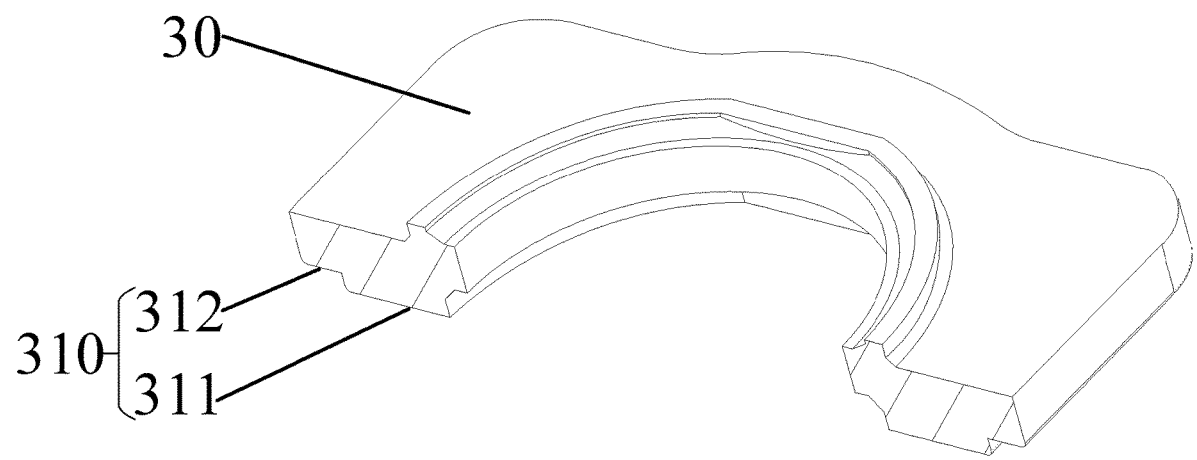
FIG. 7 is a schematic structural diagram of FIG. 6.

Furthermore, the recessed portion 310 may have a shape same as or different from a shape of the protrusion structure. Optionally, the shape of the recessed portion 310 is the same as that of the protrusion structure, to improve the sealing performance between the first boss 121 and the upper plastic member 30 and the reliability of anti-torsion. Specifically, referring to FIGS. 6 and 7, the recessed portion 310 includes a first sinking table 311 recessed from the bottom side of the upper plastic member 30 in a direction away from the aluminum sheet 10. The first sinking table 311 may have a shape substantially adapted to the shape of the first boss 121. In this way, the first sinking table 311 is firmly attached to the first boss 121 to prevent the electrolyte in the cell structure from leaking out from the pole through-hole 110. In addition, the shape of the first sinking table 311 being adapted to the shape of the first boss 121 can further improve the resistance of the first sinking table 311 and the first boss 121 to the torsion force, thereby improving the reliability of the protrusion structure and the recessed portion 310.

The first sinking table 311 having the shape substantially adapted to the shape of the first boss 121 means that the shape of the first sinking table 311 is substantially same as the shape of the first boss 121. In other words, the first sinking table 311 may be a circular sinking table, a rectangular sinking table, a special-shaped sinking table, or the like.

Furthermore, the recessed portion 310 further includes at least one second sinking table 312 that is recessed from a partial region of a bottom side of the first sinking table 311 close to the aluminum sheet in the direction away from the aluminum sheet 10. Each second sinking table 312 may have a shape substantially adapted to a shape of a respective second boss 122 and the number of the at least one second sinking table 312 is the same as the number of the at least one second boss 122. In this way, each respective second sinking table 312 is firmly attached to the respective second boss 122 to prevent the electrolyte in the cell structure from leaking out from the pole through-hole 110, and to improve the resistance of the respective second sinking table 312 and the respective second boss 122 to the torsion force, thereby further improving the limiting ability between the protrusion structure and the recessed portion 310, and thereby improving the reliability of the protrusion structure and the recessed portion 310.

Each second sinking table 312 having the shape substantially adapted to the shape of the respective second boss 122 means that the shape of the respective second sinking table 312 is the substantially same as the shape of the respective second boss 122. For example, each second sinking table 312 may be a sinking table in a shape of a straight line or a non-straight-line shaped sinking table. The non-straight-line shaped sinking table may be a S-shaped sinking table, a C-shaped sinking table, an arc-shaped sinking table, or the like. When the second sinking table 122 is an arc-shaped sinking table, an arc center of the second sinking table 122 does not coincide with a center of the pole through-hole 11.

Furthermore, the first boss 121 and the at least one second boss 122 are integrally formed with the aluminum sheet 10. Each pole post 20 is integrally formed with the respective upper plastic member 30 after penetrating through the respective pole through-hole 110. The bottom side of the upper plastic member 30 is firmly attached to the top side of the aluminum sheet 10. Therefore, the first boss 121 and the at least one second boss 122 being integrally formed with the aluminum sheet 10 to facilitate processing and manufacturing of the aluminum sheet 10. The upper plastic member 30 being integrally formed with the pole post 20 and being firmly attached to the top side of the aluminum sheet 10 help to improve sealing performance between the upper plastic member 30, the pole post 20, and the aluminum sheet 10. In addition, the first boss 121 and the at least one second boss 122 are integrally formed with the aluminum sheet 10 through extrusion molding, and the upper plastic member 30 is integrally formed on the pole post 20 through injection molding.

Furthermore, referring again to FIGS. 1 to 3, each respective pole post 20 is provided with an embedded portion 210 on a circumferential side of the respective pole post 20 and at a position corresponding to the respective pole through-hole 110. A mating portion 111 is provided on an inner wall of the pole through-hole 110, and the embedded portion 210 is adapted to the mating portion 111 in shape, so that the respective pole post 20 can be fixed in the respective pole through-hole 110. In this way, since the upper plastic member 30 is sleeved and fixed on the respective pole post 20, the pole post 20 being fixed in the pole through-hole 110 of the aluminum sheet 10 can further prevent the upper plastic member 30 from rotating relative to the aluminum sheet 10, thereby improving the reliability of safe use of the cell top cover.

Specifically, the embedded portion 210 may be a screw thread structure, or a groove, and correspondingly, the mating portion 111 is a structure adapted to the embedded portion 210. The shapes of the embedded portion 210 and the mating portion 111 may be specifically determined according to actual design and use requirements, which are not limited herein.

Further, the at least one pole post 20 includes a positive pole post and a negative pole post, and correspondingly, the at least one pole through-hole 110 includes a positive pole through-hole 110 for the positive pole post to penetrate through the aluminum sheet and a negative pole through-hole 110 for the negative pole post to penetrate through the aluminum sheet. The cell top cover further includes a lower plastic member 40, an explosion-proof valve 50, at least one sealing ring 60, and other structures. Each pole post 20 penetrates through the lower plastic member 40, the aluminum sheet 10, and the respective upper plastic member 30 sequentially and then is integrally formed with the respective upper plastic member 30. Each sealing ring 60 is disposed between the lower plastic member 40 and the aluminum sheet 10 and is sleeved on the respective pole post 20.

Similarly, the at least one sealing ring 60 includes a positive sealing ring and a negative sealing ring. The at least one upper plastic member 30 includes a positive upper plastic member and a negative upper plastic member. The lower plastic member 40 may include a same material as the material of the upper plastic member.

Embodiments of the disclosure further provide a cell. The cell includes a cell top cover described in any embodiment of the disclosure. In the cell, the at least one upper plastic member 30 of the cell top cover is mounted on the aluminum sheet 10, which can limit rotation of the upper plastic member 30 relative to the aluminum sheet 10, and does not need to additionally fill particles between the upper plastic member 30 and the aluminum sheet 10, thereby reducing the assembly complexity of the cell top cover. In addition, using the limiting portion 120 to limit the upper plastic member 30 to rotate relative to the aluminum sheet 10 has a relatively high reliability, such that the reliability of safe use of the cell top cover can be improved.

Specifically, the cell includes a cell top cover and a cell body. The cell top cover is disposed on a top side of the cell body, and electrolyte in the cell is located in the cell body. Each pole post 20 on the cell top cover has one end extending into the cell body to be connected with electrodes in the cell body, and has the other end extending through the cell top cover to the outside for connecting an external circuit.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "has," "having," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

In addition, when parts such as a layer, a film, a region, or a plate is referred to as being "on" another part, it may be "directly on" another part or may have another part present therebetween. In addition, when a part of a layer, film, region, plate, etc., is "directly on" another part, it means that no other part is positioned therebetween.

The foregoing describes "a cell top cover and a cell provided in the embodiments of the disclosure in detail. Herein, the principle and implementations of the disclosure are described by specific examples. The description of the above implementations is only used to help understand the idea of the disclosure, and there will be changes in the specific implementation and application scope. In summary, the contents of this specification should not be understood as limiting the disclosure.

What is claimed is:

1. A cell top cover, comprising an aluminum sheet having a top side, at least one pole post, and at least one upper plastic member, wherein
    the aluminum sheet defines at least one pole through-hole, and each respective pole post of the at least one pole post penetrates through a respective pole through-hole of the at least one pole through-hole, and wherein the at least one upper plastic member is disposed on the top side of the aluminum sheet, and a respective upper plastic member of the at least one upper plastic member is sleeved and fixed on the respective pole post; and
    the aluminum sheet is provided with at least one limiting portion on the top side of the aluminum sheet, and wherein a respective limiting portion of the at least one limiting portion protrudes from a circumferential side of the respective pole through-hole, and is fitted and connected with the respective upper plastic member to limit rotation of the respective upper plastic member relative to the aluminum sheet;
    wherein the respective limiting portion has a protrusion structure arranged on the circumferential side of the respective pole through-hole and the protrusion structure includes:
    a first boss protruding upward from the top side of the aluminum sheet; and
    at least one second boss protruding upward from a partial region of a top side of the first boss away from the aluminum sheet; and
    wherein the respective upper plastic member is provided with a recessed portion, corresponding to the protrusion structure, on a bottom side of the respective upper plastic member facing the aluminum sheet, and the protrusion structure is snapped into the recessed portion, wherein
    the recessed portion includes a first sinking table recessed from the bottom side of the respective upper plastic member in a direction away from the aluminum sheet, and the first sinking table has a shape adapted to a shape of the first boss; and
    the recessed portion further includes at least one second sinking table that is recessed from a partial region of a bottom side of the first sinking table facing the aluminum sheet in the direction away from the aluminum sheet, and a respective second sinking table of the at least one second sinking table has a shape adapted to a shape of a respective second boss of the at least one second boss.

2. The cell top cover of claim 1, wherein the first boss is a rectangular boss and each respective second boss of the at least one second boss is a strip-shaped boss, and wherein the at least one second boss is configured as a plurality of second bosses, and the plurality of second bosses are uniformly arranged on two opposite edges, of the first boss, arranged in a length direction of the first boss.

3. The cell top cover of claim 2, wherein the each respective second boss is an arc-shaped boss, and an arc center of the each respective second boss is inconsistent with a center of the respective pole through-hole.

4. The cell top cover of claim 1, wherein the first boss and the at least one second boss are integrally formed with the aluminum sheet; and
    the respective pole post is integrally formed with the respective upper plastic member after penetrating through the respective pole through-hole, and the bottom side of the respective upper plastic member is firmly attached to the top side of the aluminum sheet.

5. The cell top cover of claim 1, wherein the respective pole post is provided with an embedded portion on a circumferential side of the respective pole post and at a position corresponding to the respective pole through-hole, and a mating portion is provided on an inner wall of the respective pole through-hole, and wherein the embedded portion is fitted and connected with the mating portion, in such a manner that the respective pole post is fixed in the respective pole through-hole.

6. The cell top cover of claim 1, wherein a number of the at least one second boss is the same as a number of the at least one second sinking table.

7. A cell, comprising a cell top cover comprising an aluminum sheet having a top side, at least one pole post, and at least one upper plastic member, wherein
the aluminum sheet defines at least one pole through-hole, and each respective pole post of the at least one pole post penetrates through a respective pole through-hole of the at least one pole through-hole, and wherein the at least one upper plastic member is disposed on the top side of the aluminum sheet, and a respective upper plastic member of the at least one upper plastic member is sleeved and fixed on the respective pole post; and
the aluminum sheet is provided with at least one limiting portion on the top side of the aluminum sheet, and wherein a respective limiting portion of the at least one limiting portion protrudes from a circumferential side of the respective pole through-hole, and is fitted and connected with the respective upper plastic member to limit rotation of the respective upper plastic member relative to the aluminum sheet;
wherein the respective limiting portion has a protrusion structure arranged on the circumferential side of the respective pole through-hole and the protrusion structure includes:
a first boss protruding upward from the top side of the aluminum sheet; and
at least one second boss protruding upward from a partial region of a top side of the first boss away from the aluminum sheet; and
wherein the respective upper plastic member is provided with a recessed portion, corresponding to the protrusion structure, on a bottom side of the respective upper plastic member facing the aluminum sheet, and the protrusion structure is snapped into the recessed portion, wherein
the recessed portion includes a first sinking table recessed from the bottom side of the respective upper plastic member in a direction away from the aluminum sheet, and the first sinking table has a shape adapted to a shape of the first boss; and
the recessed portion further includes at least one second sinking table that is recessed from a partial region of a bottom side of the first sinking table facing the aluminum sheet in the direction away from the aluminum sheet, and a respective second sinking table of the at least one second sinking table has a shape adapted to a shape of a respective second boss of the at least one second boss.

8. The cell of claim 7, wherein the first boss is a rectangular boss and each respective second boss of the at least one second boss is a strip-shaped boss, and wherein the at least one second boss is configured as a plurality of second bosses, and the plurality of second bosses are uniformly arranged on two opposite edges, of the first boss, arranged in a length direction of the first boss.

9. The cell of claim 8, wherein the each respective second boss is an arc-shaped boss, and an arc center of the each respective second boss is inconsistent with a center of the respective pole through-hole.

10. The cell of claim 7, wherein the first boss and the at least one second boss are integrally formed with the aluminum sheet; and
the respective pole post is integrally formed with the respective upper plastic member after penetrating through the respective pole through-hole, and the bottom side of the respective upper plastic member is firmly attached to the top side of the aluminum sheet.

11. The cell of claim 7, wherein the respective pole post is provided with an embedded portion on a circumferential side of the respective pole post and at a position corresponding to the respective pole through-hole, and a mating portion is provided on an inner wall of the respective pole through-hole, and wherein the embedded portion is fitted and connected with the mating portion, in such a manner that the respective pole post is fixed in the respective pole through-hole.

12. The cell of claim 7, wherein a number of the at least one second boss is the same as a number of the at least one second sinking table.

* * * * *